US012681140B2

(12) United States Patent
Wada et al.

(10) Patent No.: US 12,681,140 B2
(45) Date of Patent: Jul. 14, 2026

(54) ANTENNA DEVICE AND RADAR SYSTEM

(71) Applicant: KABUSHIKI KAISHA TOSHIBA, Tokyo (JP)

(72) Inventors: Kentaro Wada, Kawasaki (JP); Koh Hashimoto, Yokohama (JP); Ryota Sekiya, Kamakura (JP); Hiroshi Yoshida, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 352 days.

(21) Appl. No.: 18/362,313

(22) Filed: Jul. 31, 2023

(65) Prior Publication Data

US 2024/0241220 A1 Jul. 18, 2024

(30) Foreign Application Priority Data

Jan. 18, 2023 (JP) ................................. 2023-005847

(51) Int. Cl.
| | |
|---|---|
| *G01S 7/35* | (2006.01) |
| *G01S 7/02* | (2006.01) |
| *H01Q 5/49* | (2015.01) |
| *H01Q 13/10* | (2006.01) |

(52) U.S. Cl.
CPC .............. *G01S 7/352* (2013.01); *G01S 7/027* (2021.05); *H01Q 5/49* (2015.01); *H01Q 13/106* (2013.01)

(58) Field of Classification Search
CPC ........... G01S 7/352; G01S 7/027; H01Q 5/49; H01Q 13/106
See application file for complete search history.

(56) References Cited

U.S. PATENT DOCUMENTS

| | | | |
|---|---|---|---|
| 4,924,622 A | 5/1990 | Goreham | |
| 9,638,795 B2 | 5/2017 | Ahmed | |
| 10,330,785 B2 | 6/2019 | Ahmed | |
| 10,886,622 B1 * | 1/2021 | Patel .................. | H01Q 15/0066 |
| 10,892,547 B2 * | 1/2021 | Rakib .................. | H01Q 21/065 |
| 2020/0320731 A1 * | 10/2020 | Sheen ................. | G06F 3/04815 |
| 2021/0242555 A1 * | 8/2021 | Pandey .................... | H01P 3/16 |

FOREIGN PATENT DOCUMENTS

| | | |
|---|---|---|
| JP | 7026869 B2 | 2/2022 |

OTHER PUBLICATIONS

M. Harter, T. Mahler, T. Schipper, A. Ziroff and T. Zwick, "2-D antenna array geometries for MIMO radar imaging by Digital Beamforming," 2013 European Radar Conference, Nuremberg, Germany, 2013, pp. 383-386. (Year: 2013).*
Cheng, et al., "340-GHz 3-D Imaging Radar With 4Tx-16Rx MIMO Array", IEEE Transactions on Terahertz Science and Technology, vol. 8, No. 5, Sep. 2018, pp. 509-519.

(Continued)

*Primary Examiner* — Resha Desai
*Assistant Examiner* — Peter Davon Doze
(74) *Attorney, Agent, or Firm* — Holtz, Holtz & Volek PC

(57) ABSTRACT

According to one embodiment, an antenna device includes a transmitting antenna including a plurality of transmitting elements, and a receiving antenna including a plurality of receiving elements. A maximum value of a mutual coupling between the plurality of receiving elements is less than a maximum value of a mutual coupling between the plurality of transmitting elements.

18 Claims, 12 Drawing Sheets

(56)         References Cited

OTHER PUBLICATIONS

Guo, et al., "Millimeter-Wave 3-D Imaging Testbed With MIMO Array", IEEE Transactions on Microwave Theory A},D Techniques, vol. 68, No. 3, Mar. 1, 2020, pp. 1164-1174.

Harter, et al., "2-D Antenna Array Geometries for MIMO Radar Imaging by Digital Beamforming", 2013 European Microw. Conf., pp. 1695-1698, Oct. 6, 2013.

Ahmed, et al., "Mutual Coupling Reduction Using Defected Ground Structure (DGS) for Array Applications", 2012 15 International Symposium on Antenna Technology and Applied Electromagnetics, 2012, pp. 1-5.

Choi, et al., "Frequency-Scanning Phased-Array Feed Network Based on Composite Right/Left-Handed Transmission Lines", IEEE Transactions on Microwave Theory and Techniques, vol. 61, No. 8, pp. 3148-3157, Aug. 2013.

Farahani, et al., "Mutual Coupling Reduction in Patch Antenna Arrays Using a UC-EBG Superstrate", IEEE Antennas and Wireless Propagation Letters, vol. 9, pp. 57-59, 2010.

Gao, et al., "A defected ground structure (DGS) for reducing the mutual coupling of dual polarized microstrip antennas", 2018 International Conference on Microwave and Millimeter Wave Technology (ICMMT), 2018, pp. 1-3.

Hwangbo, et al., "Mutual Coupling Reduction Using Micromachined Complementary Meander-Line Slots for a Patch Array Antenna", IEEE Antennas and Wireless Propagation Letters, vol. 16, pp. 1667-1670, 2017.

Itoh, et al., "The Mutual Coupling Reduction between Two Inverted-F Antennas Using Mushroom Structures", J92-B, No. 6, pp. 930-937, 2009.

Li, et al., "Analysis and Design of Waveguide Slot Antenna Array Integrated With Electromagnetic Band-Gap Structures", IEEE Antennas and Wireless Propagation Letters, vol. 5, pp. 111-115, 2006.

Suga, et al., "Cost-Effective 60-GHz Antenna Package With End-Fire Radiation for Wireless File-Transfer System", IEEE Transactions on Microwave Theory and Techniques, vol. 58, No. 12, pp. 3989-3995, Dec. 2010.

* cited by examiner

ANTENNA DEVICE AND RADAR SYSTEM

CROSS-REFERENCE TO RELATED APPLICATIONS

This application is based upon and claims the benefit of priority from Japanese Patent Application No. 2023-005847, filed on Jan. 18, 2023; the entire contents of which are incorporated herein by reference.

FIELD

Embodiments of the invention generally relate to an antenna device and a radar system.

BACKGROUND

For example, improved performance is desired in antenna devices.

DETAILED DESCRIPTION

Figure 1:
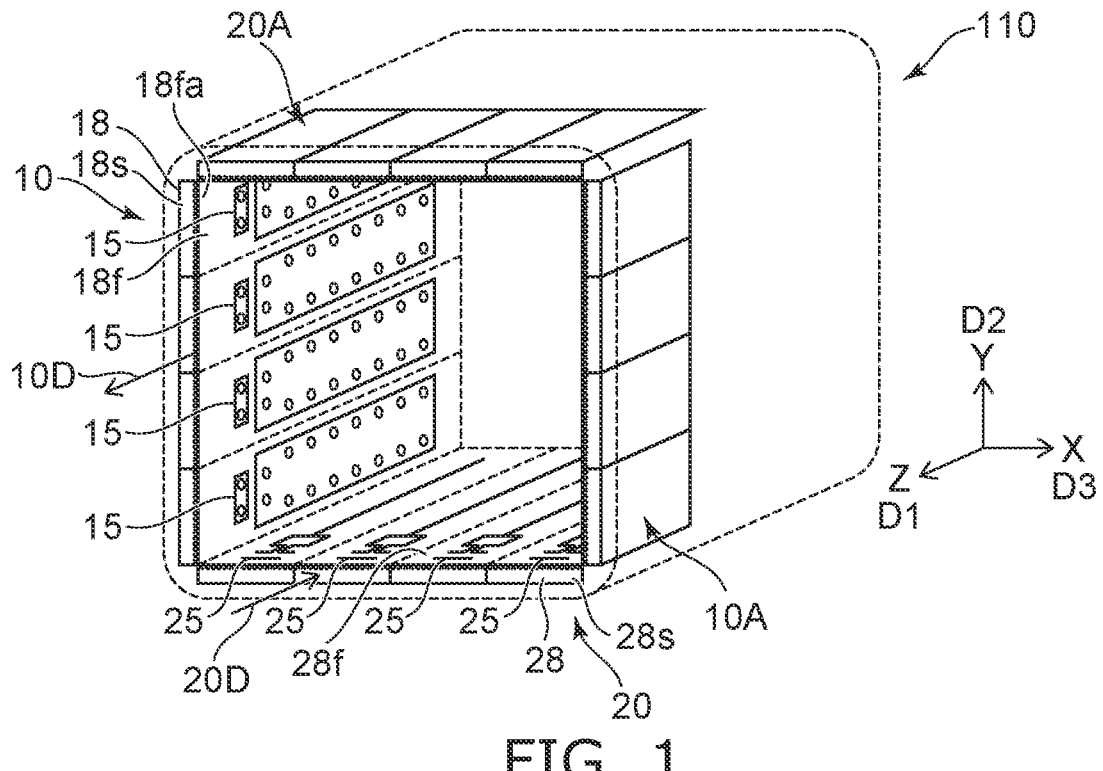
FIG. 1 is a schematic perspective view illustrating an antenna device according to a first embodiment.

According to one embodiment, an antenna device includes a transmitting antenna including a plurality of transmitting elements, and a receiving antenna including a plurality of receiving elements. A maximum value of a mutual coupling between the plurality of receiving elements is less than a maximum value of a mutual coupling between the plurality of transmitting elements.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic perspective view illustrating an antenna device according to the first embodiment.

Figure 2:
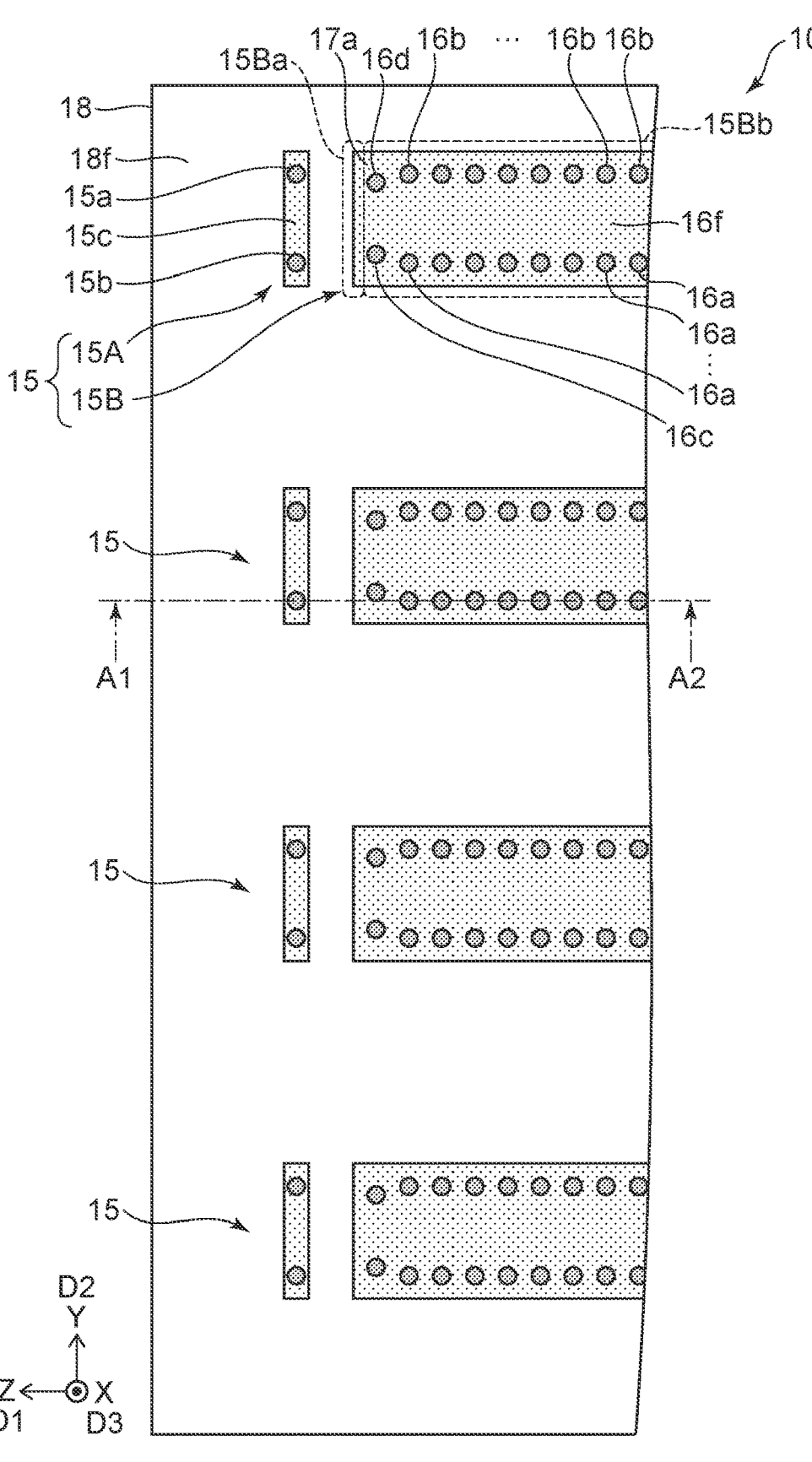
FIG. 2 is a schematic plan view illustrating a part of the antenna device according to the first embodiment.
Figure 3:
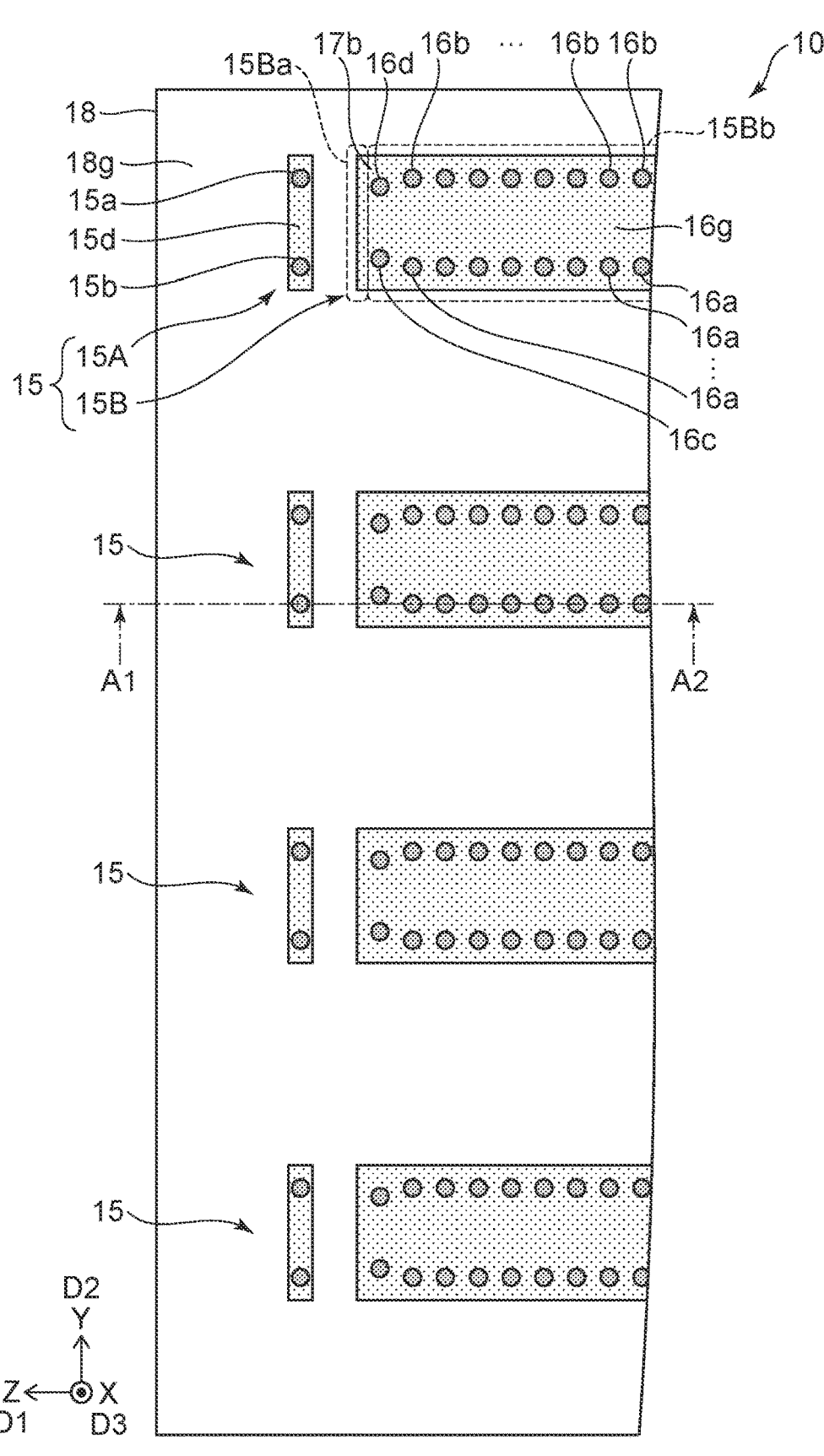
FIG. 3 is a schematic plan view illustrating a part of the antenna device according to the first embodiment.

FIGS. 2 and 3 are schematic plan views illustrating a part of the antenna device according to the first embodiment.

Figure 4:
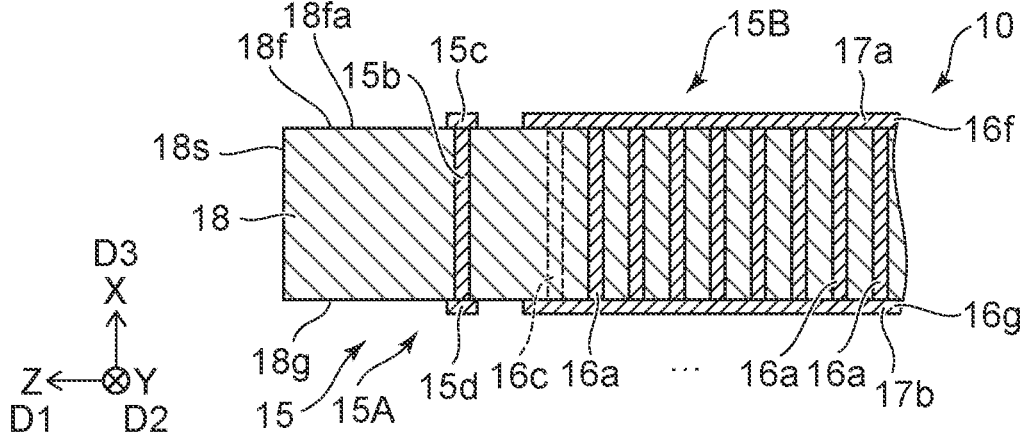
FIG. 4 is a schematic cross-sectional view illustrating a part of the antenna device according to the first embodiment.

FIG. 4 is a schematic cross-sectional view illustrating a part of the antenna device according to the first embodiment.

Figure 5:
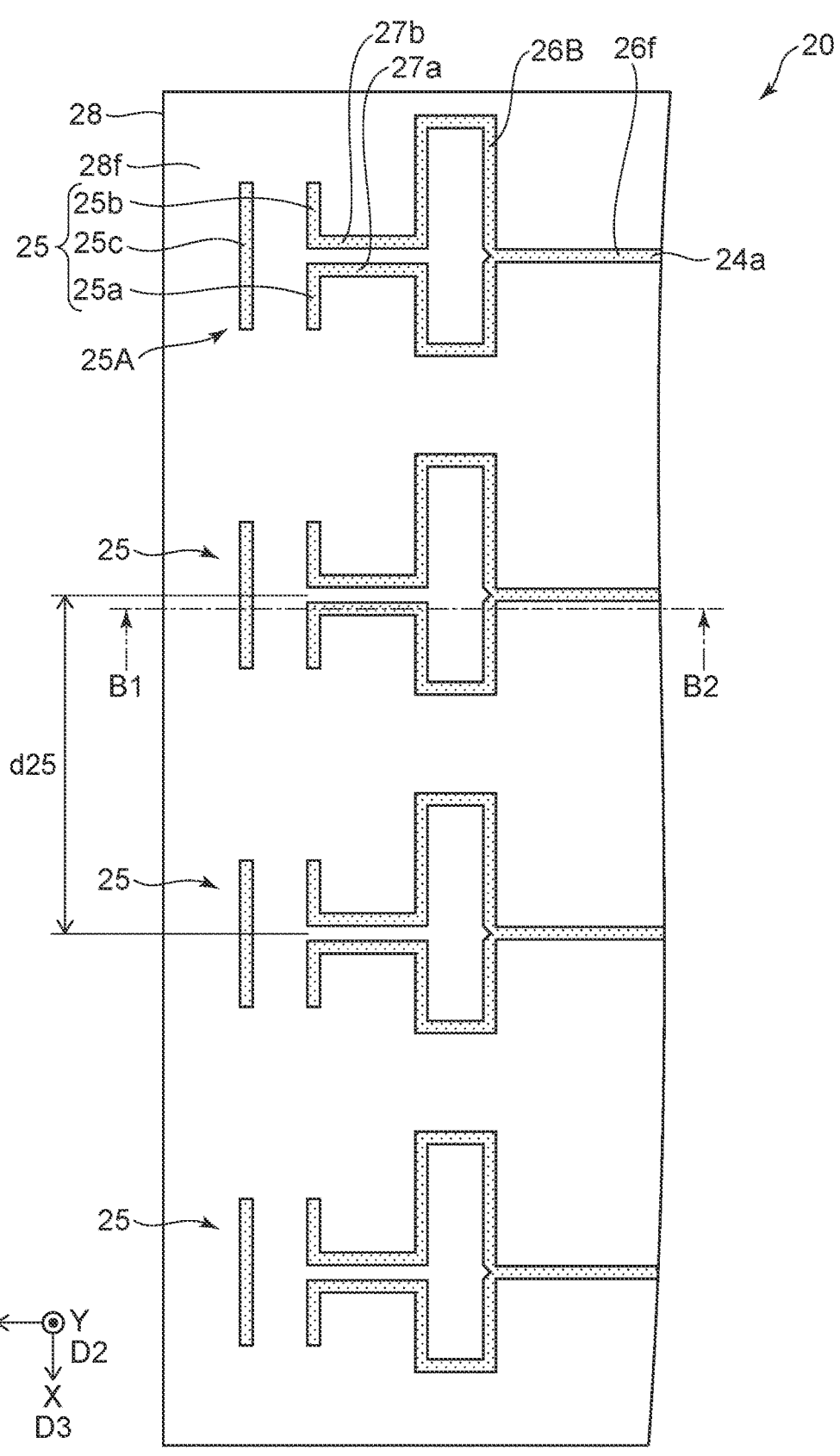
FIG. 5 is a schematic plan view illustrating a part of the antenna device according to the first embodiment.
Figure 6:
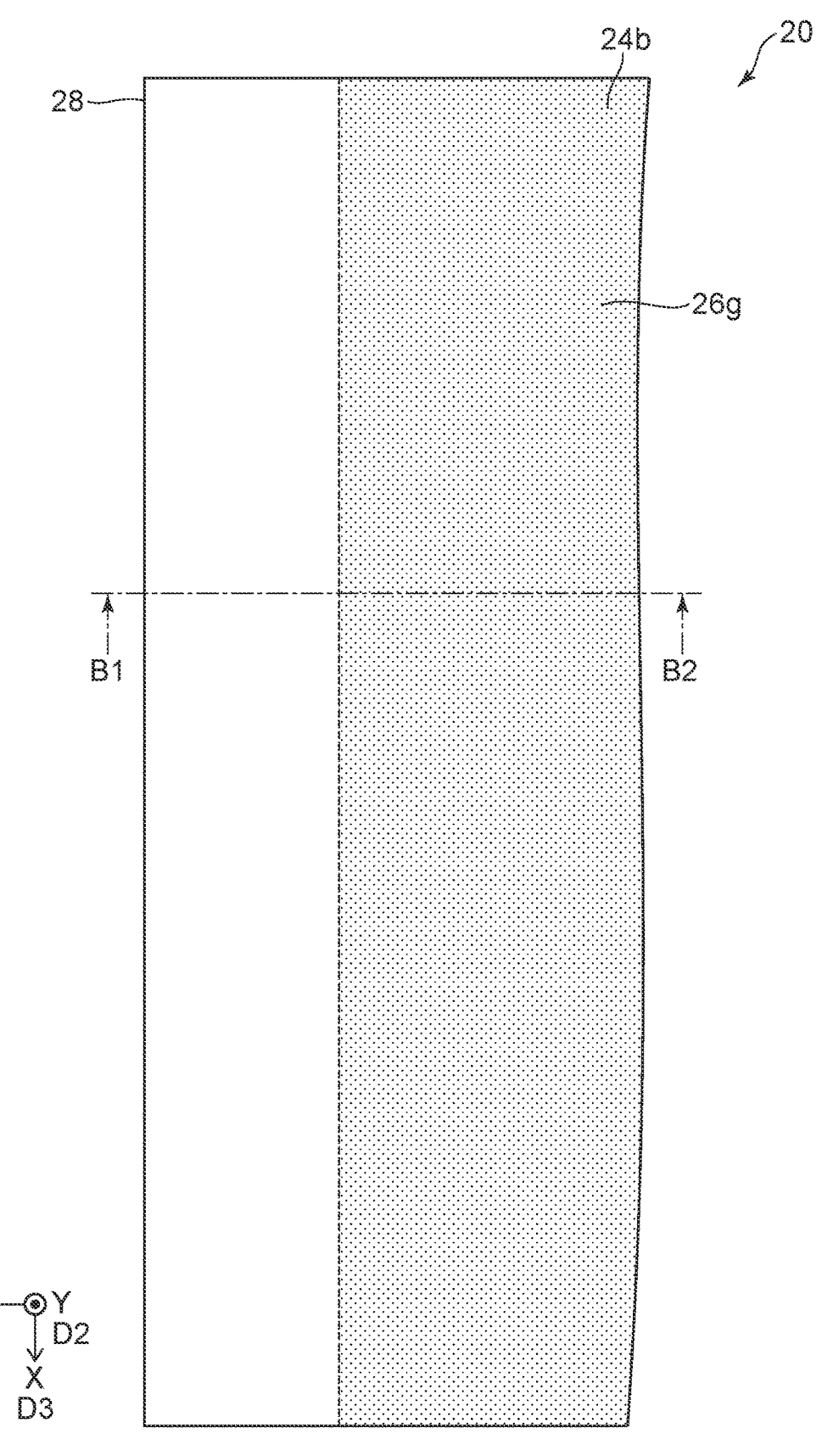
FIG. 6 is a schematic plan view illustrating a part of the antenna device according to the first embodiment.

FIGS. 5 and 6 are schematic plan views illustrating a part of the antenna device according to the first embodiment.

Figure 7:
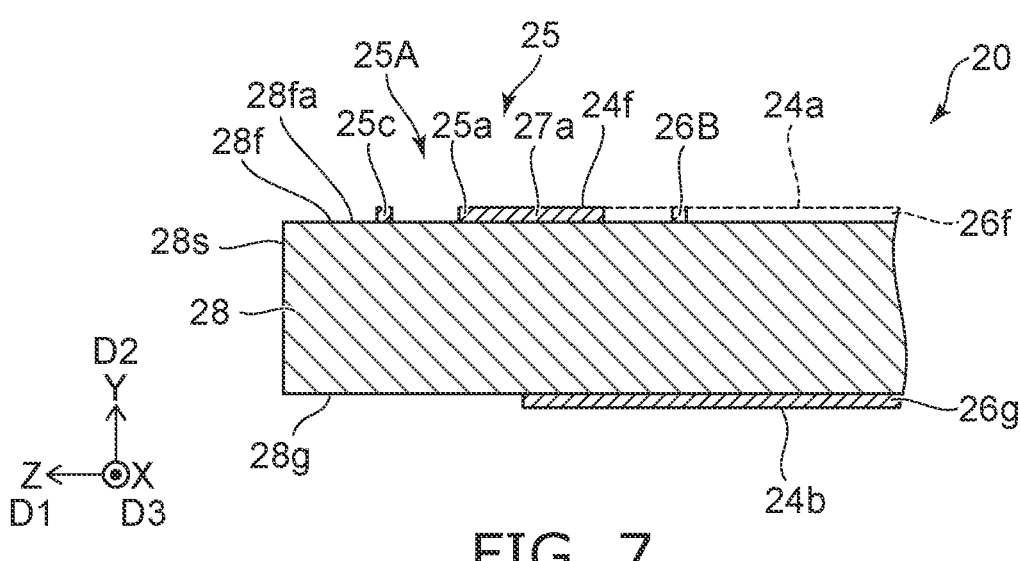
FIG. 7 is a schematic cross-sectional view illustrating part of the antenna device according to the first embodiment.

FIG. 7 is a schematic cross-sectional view illustrating a part of the antenna device according to the first embodiment.

As shown in FIG. 1, an antenna device 110 according to the embodiment includes a transmitting antenna 10 and a receiving antenna 20. The transmitting antenna 10 includes a plurality of transmitting elements 15. The receiving antenna 20 includes a plurality of receiving elements 25. In the embodiment, the maximum value of mutual coupling between the plurality of receiving elements 25 is less than the maximum value of the mutual coupling between the plurality of transmitting elements 15. Thereby, for example, high receiving performance can be obtained.

The transmitting antenna 10 is, for example, a transmitting array antenna. The plurality of transmitting elements 15 are, for example, a plurality of transmitting feeding elements. The receiving antenna 20 is, for example, a receiving array antenna. The plurality of receiving elements 25 are, for example, a plurality of receiving feeding elements.

The mutual coupling between the plurality of transmitting elements 15 is an inter-element mutual coupling between one of the plurality of transmitting elements 15 and another one of the plurality of transmitting elements 15. The mutual coupling between the plurality of receiving elements 25 is an inter-element mutual coupling between one of the plurality of receiving elements 25 and another one of the plurality of receiving elements 25.

For example, in a first reference example in which the mutual coupling in the receiving antenna 20 is large, the electromagnetic field from the coupled elements is likely to be received and become noise. As a result, for example, when the antenna device is applied to a radar or the like, detection characteristics are likely to deteriorate.

In the embodiment, the maximum value of the mutual coupling between elements of the receiving array antenna is smaller than the maximum value of the mutual coupling between elements of the transmitting array antenna. By the mutual coupling between the elements of the receiving array antenna being small, the influence of the electromagnetic field from the coupled elements can be reduced. Noise is suppressed. According to the embodiments, it is possible to provide an antenna device capable of improving performance.

As shown in FIG. 1, the transmitting antenna 10 includes a first substrate 18 in this example. The first substrate 18 includes a first face 18f. The receiving antenna 20 includes a second substrate 28. The second substrate 28 includes a second face 28f. A plane including the second face 28f crosses a plane including the first face 18f. The plurality of transmitting elements 15 are provided along the first face 18f. The plurality of receiving elements 25 are provided along the second face 28f.

For example, the first face 18f extends along a first direction D1 and a second direction D2. The second direction D2 crosses the first direction D1. The second face 28f extends along the first direction D1 and a third direction D3. The third direction D3 crosses a plane including the first direction D1 and the second direction D2.

The first direction D1 is, for example, a Z-axis direction. One direction perpendicular to the Z-axis direction is defined as a Y-axis direction. The direction perpendicular to the Z-axis direction and the Y-axis direction is defined as an X-axis direction.

The second direction D2 may be, for example, the Y-axis direction. The third direction D3 may be, for example, the X-axis direction. The second direction D2 may for example, be orthogonal to the first direction D1. The third direction D3 may be orthogonal to the first direction D1 and the second direction D2.

As shown in FIG. 1, a transmitting direction 10D of the transmitting antenna 10 is along the first direction D1. A receiving direction 20D of the receiving antenna 20 is along the first direction D1.

For example, the first substrate 18 includes a first side face 18s. The first side face 18s crosses the first face 18f. The transmitting direction 10D of the transmitting antenna 10 crosses the first side face 18s. The transmitting direction 10D may for example, be substantially perpendicular to the first side face 18s.

For example, the second substrate 28 includes a second side face 28s. The second side face 28s crosses the second face 28f. The receiving direction 20D of the receiving antenna 20 crosses the second side face 28s. The receiving direction 20D may for example, be substantially perpendicular to the second side face 28s.

FIGS. 2 to 4 correspond to the transmitting antenna 10. FIG. 4 is a cross-sectional view taken along the line A1-A2 of FIGS. 2 and 3. As shown in FIG. 4, the first substrate 18 includes a first surface 18fa. The first surface 18fa extends along the first face 18f. The first surface 18fa may be the same as the first face 18f. The plurality of transmitting elements 15 are provided, for example, on the first surface 18fa. Alternatively, at least a part the plurality of transmitting elements 15 may be provided inside the first substrate 18. The first substrate 18 includes a dielectric. The first substrate 18 is an insulating substrate.

FIGS. 5 to 7 correspond to the receiving antenna 20. FIG. 7 is a cross-sectional view taken along the line B1-B2 of FIGS. 5 and 6. As shown in FIG. 7, the second substrate 28 includes a second surface 28fa. The second surface 28fa extends along the second face 28f. The second surface 28fa may be the same as the second face 28f. The plurality of receiving elements 25 are provided, for example, on the second surface 28fa. Alternatively, at least a part of the plurality of receiving elements 25 may be provided inside the second substrate 28. The second substrate 28 includes a dielectric. The second substrate 28 is an insulating substrate.

As shown in FIGS. 1 and 2, the plurality of transmitting elements 15 are arranged along the second direction D2. For example, the mutual coupling between the plurality of transmitting elements 15 depends on the distance (e.g., pitch) between the plurality of transmitting elements 15 along the second direction D2. The longer the distance, the smaller the mutual coupling.

As shown in FIGS. 1 and 5, the plurality of receiving elements 25 are arranged along the third direction D3. For example, the mutual coupling between the plurality of receiving elements 25 depends on the distance (e.g., pitch) between the plurality of receiving elements 25 along the third direction D3. The longer the distance, the smaller the mutual coupling. By changing the distance (pitch), the mutual coupling can be changed.

As shown in FIGS. 2 and 5, in the embodiment, the shape of one of the plurality of receiving elements 25 may differ from the shape of one of the plurality of transmitting elements 15. Thereby, the maximum value of mutual coupling between the plurality of receiving elements 25 can be made smaller than the maximum value of mutual coupling between the plurality of transmitting elements 15.

For example, at least a part of the plurality of transmitting elements 15 include a SIW 15B (Substrate Integrated Waveguide) (see FIGS. 2 to 4). At least a part of the plurality of transmitting elements 15 may further include a director 15A (see FIGS. 2-4). The SIW 15B is, for example, a post wall waveguide. On the other hand, for example, at least a part of the plurality of receiving elements 25 include a quasi-Yagi antenna 25A (see FIGS. 5 to 7).

In the example of antenna device 110, the plurality of transmitting elements 15 include the SIW 15B and the director 15A. The plurality of receiving elements 25 are the quasi-Yagi antennas 25A. In the SIW 15B, TE mode electric field is propagated parallel to the third direction D3, and an electric field parallel to the third direction D3 is transmitted via the director 15A. An electric field parallel to the third direction D3 is received by the quasi-Yagi antenna 25A.

Examples of shapes of the plurality of transmitting elements 15 will be described below.

As shown in FIG. 4, the first substrate 18 of the transmitting antenna 10 includes the first face 18f and a first other face 18g. A direction from the first other face 18g to the first face 18f is along the third direction D3. A first conductive member 16f is provided on the first face 18f. A first other conductive member 16g is provided on the first other face 18g. The first substrate 18 is provided between these conductive members.

As shown in FIGS. 2 to 4, a first conductive layer 15c is formed by the first conductive member 16f. A first other conductive layer 15d is formed by the first other conductive member 16g. The first conductive layer 15c and the first other conductive layer 15d are electrically connected by a first electrode member 15a and a second electrode member 15b. A direction from the second electrode member 15b to the first electrode member 15a is along the second direction D2. The director 15A is formed by the first conductive layer 15c, the first other conductive layer 15d, the first electrode member 15a, and the second electrode member 15b.

As shown in FIGS. 2 to 4, a first waveguide conductive layer 17a is formed by the first conductive member 16f. A first other waveguide conductive layer 17b is formed by the first other conductive member 16g. The first waveguide conductive layer 17a and the first other waveguide conductive layer 17b are electrically connected by a plurality of first waveguide electrode members 16a and a plurality of second waveguide electrode members 16b. The plurality of first waveguide electrode members 16a and the plurality of second waveguide electrode members 16b extend along the third direction D3. The plurality of first waveguide electrode members 16a are arranged along the first direction D1. The plurality of second waveguide electrode members 16b are arranged along the first direction D1. The direction from the plurality of first waveguide electrode members 16a to the plurality of second waveguide electrode members 16b is along the second direction D2. The SIW 15B is formed by the first waveguide conductive layer 17a, the first other waveguide conductive layer 17b, the plurality of first waveguide electrode members 16a, and the plurality of second waveguide electrode members 16b.

In this example, the third waveguide electrode member 16c and the fourth waveguide electrode member 16d are provided. The third waveguide electrode member 16c and the fourth waveguide electrode member 16d are electrically connected to the first waveguide conductive layer 17a and the first other waveguide conductive layer 17b. A distance along the second direction D2 between the third waveguide electrode member 16c and the fourth waveguide electrode member 16d is shorter than a distance along the second direction D2 between the plurality of first waveguide electrode members 16a and the plurality of second waveguide electrode members 16b. A position of the third waveguide electrode member 16c in the first direction D1 is between a position of the first conductive layer 15c in the first direction D1 and a position of the plurality of first waveguide electrode members 16a in the first direction D1. A position of the fourth waveguide electrode member 16d in the first direction D1 is between the position of the first conductive layer 15c in the first direction D1 and a position of the plurality of second waveguide electrode members 16b in the first direction D1.

For example, an aperture 15Ba is provided at the end of the first direction D1 of the SIW 15B. The aperture 15Ba functions as an aperture antenna. The SIW 15B includes a part excluding the aperture 15Ba. The part excluding the aperture 15Ba corresponds to a power supply line SIW 15Bb. The aperture 15Ba is, for example, between the third waveguide electrode member 16c and the director 15A, and between the fourth waveguide electrode member 16d and the director 15A.

One SIW 15B is coupled to another waveguide (another SIW 15B) and another director 15A. A plurality of structures including the director 15A, the SIW 15B, another waveguide (SIW 15B), and the other director 15A are provided. A plurality of such structures are arranged along the second direction D2.

The potential of the first other conductive member 16g is fixed, for example. The potential of the first other conductive member 16g may be, for example, the ground potential.

Examples of shapes of the plurality of receiving elements 25 will be described below.

As shown in FIG. 7, the second substrate 28 of the receiving antenna 20 includes the second face 28f and a second other face 28g. A direction from the second other face 28g to the second face 28f is along the second direction D2. A second conductive member 26f is provided on the second face 28f. A second other conductive member 26g is provided on the second other face 28g. The second substrate 28 is provided between these conductive members.

As shown in FIGS. 5 and 7, the quasi-Yagi antenna 25A is formed by the second conductive member 26f. The quasi-Yagi antenna 25A includes, for example, a second waveguide conductive layer 25c, a first radiation conductive layer 25a, and a first other radiation conductive layer 25b. A direction from the first other radiation conductive layer 25b to the first radiation conductive layer 25a is along the third direction D3. The first radiation conductive layer 25a extends along the third direction D3. The first other radiation conductive layer 25b extends along the third direction D3. The second waveguide conductive layer 25c is separated from the first radiation conductive layer 25a and the first other radiation conductive layer 25b along the first direction D1. The second waveguide conductive layer 25c faces the first radiation conductive layer 25a and the first other radiation conductive layer 25b in the first direction D1.

As shown in FIG. 5, the first radiation conductive layer 25a and the first other radiation conductive layer 25b are electrically connected to a feeding line 24a. In this example, baluns 26B are provided between the first radiation conductive layer 25a and the feeding line 24a, and between the first other radiation conductive layer 25b and the feeding line 24a. The balun 26B is capable of transiting between balanced and unbalanced lines. The balun 26B is formed by the second conductive member 26f. In this example, the first radiation conductive layer 25a is connected to the balun 26B by a conductive layer 27a. The first other radiation conductive layer 25b is connected to the balun 26B by a conductive layer 27b.

A second other waveguide conductive layer 24b is formed by the second other conductive member 26g. The potential of the second other conductive member 26g (second other waveguide conductive layer 24b) is fixed, for example. The potential of the second other conductive member 26g may be, for example, the ground potential.

The plurality of receiving elements 25 (quasi-Yagi antennas 25A) as described above are arranged along the third direction D3.

The maximum value of the mutual coupling between the plurality of receiving elements 25 (quasi-Yagi antenna 25 A) is smaller than the maximum value of the mutual coupling between the plurality of transmitting elements 15 (aperture 15Ba of the SIW 15B).

In the primary array antenna, a plurality of elements in the transmitting antenna and the receiving antenna are simultaneously operated. On the other hand, in a multi-static radar, the operation of a plurality of elements is different between the transmitting array antenna and the reception array antenna. For example, in the multi-static radar, one element of the transmitting array antenna sequentially transmits, and a plurality of elements of the receiving array antenna simultaneously receives. The plurality of elements of the array antenna are mutually coupled. The mutual coupling affects the operating characteristics as an antenna. At this time, the transmitting array antenna can properly terminate the transmitting antenna which is not operating. Thereby, interelement mutual coupling does not affect the detection characteristics of the radar.

On the other hand, when the mutual coupling is large in the receiving antenna, the electromagnetic field from the coupled element is received and becomes noise. The noise degrades the detection characteristics. High detection characteristics can be maintained by reducing mutual coupling in the receiving antenna. For example, different shapes are applied to the transmitting array antenna and the reception array antenna. Thereby, the maximum value of mutual coupling between elements of the receiving array antenna is easily made be smaller than the maximum value of mutual coupling between elements in the transmitting array antenna.

For example, there is a reference example in which a metamaterial (including metal walls, etc.) is provided between multiple elements. Thereby, the mutual coupling between elements can be suppressed. For example, in a patch antenna that radiates electromagnetic waves in a direction perpendicular to a substrate, it is easy to form a metamaterial by forming a metal pattern on or inside the substrate. However, when applying the method using a metamaterial to an antenna that radiates in the lateral direction of the substrate, the side surface of the substrate is processed. Furthermore, in a high frequency band such as a millimeter wave band, when a metal wall is installed between a plurality of elements, processing is performed with high accuracy.

According to the above configuration, in which a meta-material or the like can be omitted, it is possible to more easily obtain high performance in a millimeter-wave band substrate-side direction radiation antenna.

As shown in FIG. 5, a distance along the third direction D3 between the position of one of the plurality of receiving elements in the third direction D3 and the position of another one of the plurality of receiving elements 25 in the third direction D3 is defined as a distance d25. The distance d25 is equal to or less than the wavelength of the signal received by the plurality of receiving elements 25. The other one of the plurality of receiving elements 25 is next to the one of the plurality of receiving elements 25. The distance d25 corresponds to the pitch of the plurality of receiving elements 25. By reducing the distance d25, the device can be miniaturized.

As shown in FIG. 1, the antenna device 110 may include another transmitting antenna 10A and another receiving antenna 20A. In this example, a direction from the transmitting antenna 10 to the other transmitting antenna 10A is along the third direction D3. In this example, a direction from the receiving antenna 20 to the other receiving antenna 20A is along the second direction D2. The configuration of the other transmitting antenna 10A may be the same as the configuration of the transmitting antenna 10. The configuration of the other receiving antenna 20A may be the same as the configuration of the receiving antenna 20.

Figure 8:
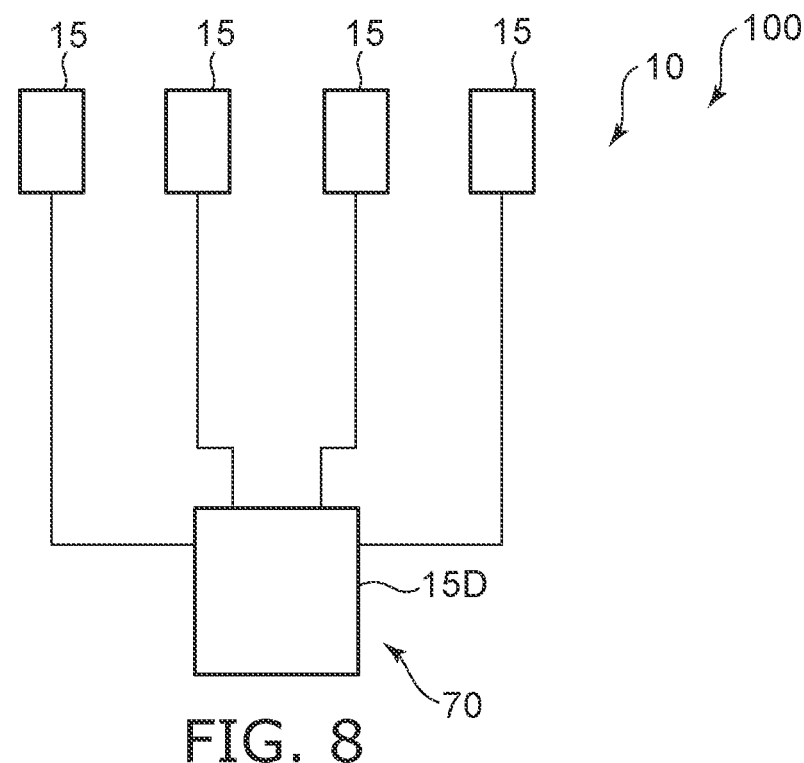
FIG. 8 is a schematic diagram illustrating the antenna device according to the first embodiment.
Figure 9:
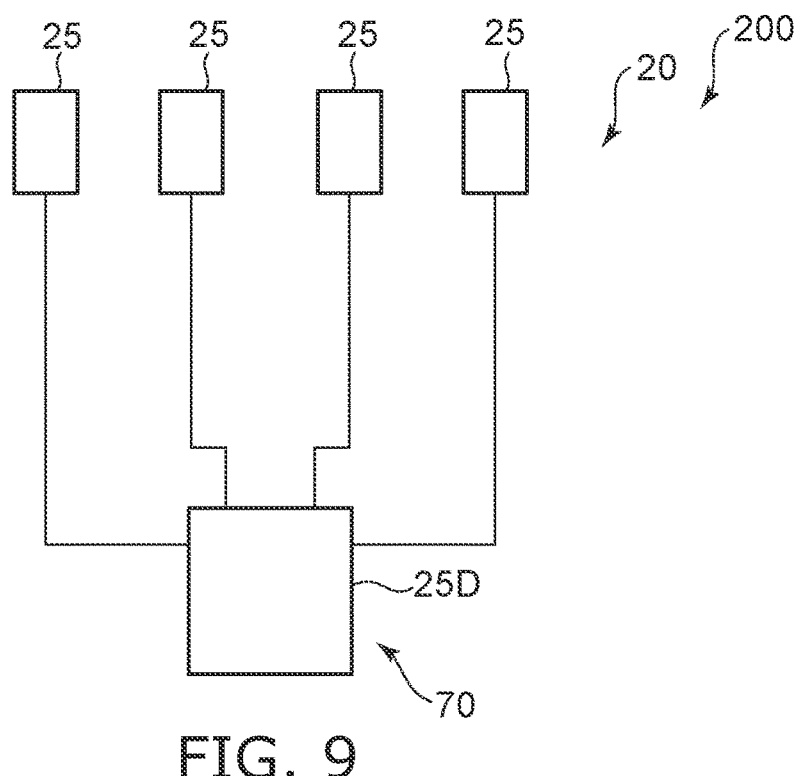
FIG. 9 is a schematic diagram illustrating the antenna device according to the first embodiment.

FIGS. 8 and 9 are schematic diagrams illustrating the antenna device according to the first embodiment.

FIG. 8 illustrates the transmitting antenna 10. In the transmitting antenna 10, the plurality of transmitting elements 15 may be coupled to a first electronic circuit 15D. For example, radio waves are transmitted from the plurality of transmitting elements 15 by an operation of the first electronic circuit 15D. The transmitting antenna 10 may include the first electronic circuit 15D. The first electronic circuit 15D may be provided separately from the transmitting antenna 10.

FIG. 9 illustrates the receiving antenna 20. In the receiving antenna 20, the plurality of receiving elements 25 may be coupled to a second electronic circuit 25D. For example, the radio waves received by the plurality of receiving elements 25 are processed by an operation of the second electronic circuit 25D. The receiving antenna 20 may include the second electronic circuit 25D. The second electronic circuit 25D may be provided separately from the receiving antenna 20.

The first electronic circuit 15D and the second electronic circuit 25D may include a control circuit 70. For example, a radar device 210 includes the antenna device 110 and the control circuit 70.

Information on the mutual coupling can be obtained by various methods. For example, there are a method using Fourier transform and a least squares method as methods for estimating the mutual coupling amount from the measured value of the radiation pattern of the antenna. In the method using the least squares method, a radiation pattern (a far radiation field of an antenna alone) when there is no mutual coupling between antennas is set as "F", and a radiation pattern when there is mutual coupling between antennas is set as "F'". When the amount of mutual coupling between antennas is "C", "F'" is equal to the product of "F'" "and C". By utilizing this relationship, the amount of mutual coupling "C" can be determined. For example, the radiation pattern "F" corresponds to the radiation pattern measured for the single antenna of the measuring target by removing the antenna other than the measurement target. The radiation pattern "F'" changed by the array corresponds to a radiation pattern measured by connecting a terminator to antennas other than the measuring target.

The value of the mutual coupling between the plurality of transmitting elements 15 may be, for example, a value of the mutual coupling between the aperture 15Ba of the SIW 15B included in one of the plurality of transmitting elements 15 and the aperture 15Ba of the SIW 15B included in another one of the plurality of transmitting elements 15.

Second Embodiment

Figure 10:
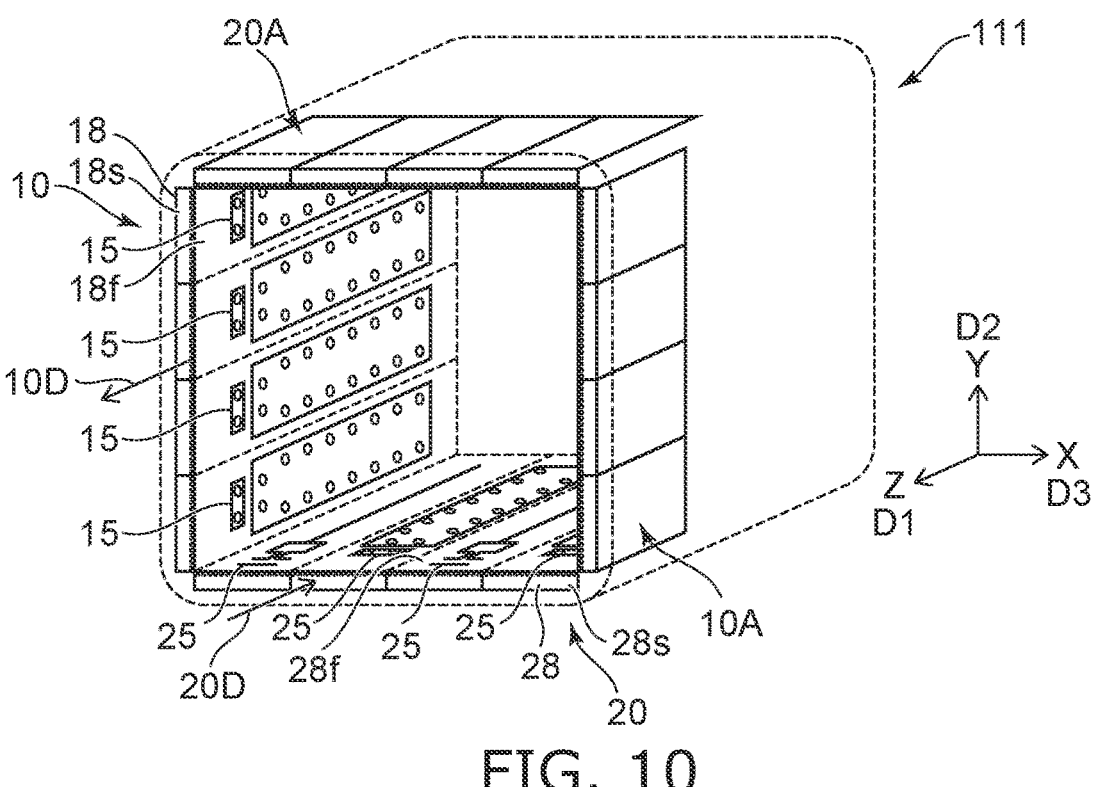
FIG. 10 is a schematic perspective view illustrating an antenna device according to a second embodiment.

FIG. 10 is a schematic perspective view illustrating an antenna device according to a second embodiment.

Figure 11:
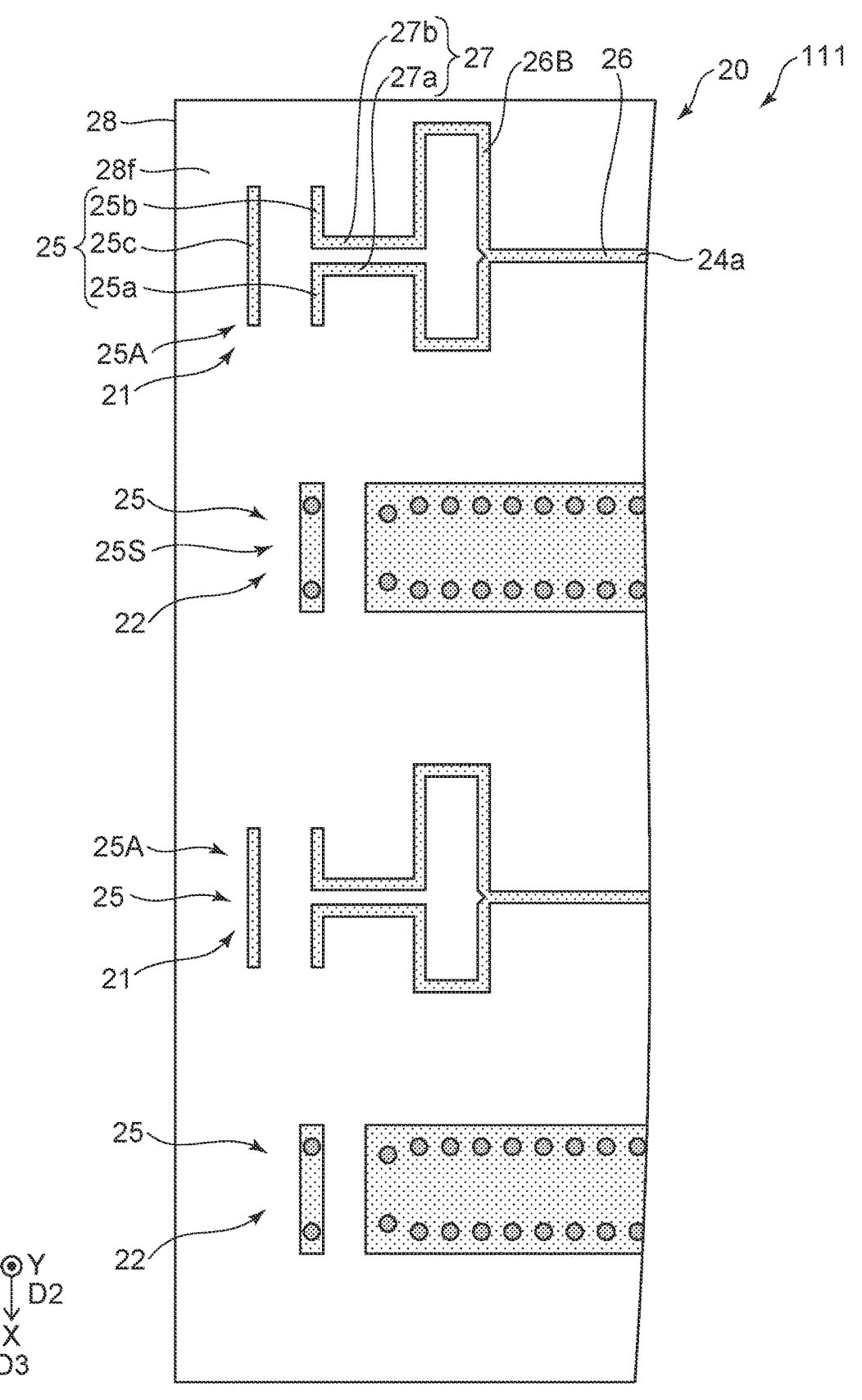
FIG. 11 is a schematic plan view illustrating a part of the antenna device according to the second embodiment.

FIG. 11 is a schematic plan view illustrating a part of the antenna device according to the second embodiment.

As shown in FIG. 10, in an antenna device 111 according to the embodiment, the configuration of the receiving antenna 20 is different from the configuration of the receiving antenna 20 in the antenna device 110. Except for this, the configuration of the antenna device 111 may be the same as the configuration of the antenna device 110. For example, the configuration of the transmitting antenna 10 in the antenna device 111 is the same as the configuration of the transmitting antenna 10 in the antenna device 110.

FIG. 11 illustrates the receiving antenna 20 in the antenna device 111. As shown in FIG. 11, the receiving antenna 20 includes the plurality of receiving elements 25. The plurality of receiving elements 25 include a plurality of first elements 21 and a plurality of second elements 22. In the antenna device 111, a first maximum value is less than the maximum value of the mutual coupling between the plurality of transmitting elements 15. The first maximum value is a maximum value of the maximum value of the mutual coupling between the plurality of first elements 21, the maximum value of mutual coupling between the plurality of second elements 22, and the maximum value of the mutual coupling between the plurality of first elements 21 and the plurality of second elements. 22. Thereby, noise can be suppressed. An antenna device capable of improving performance can be provided.

The shape of one of the plurality of first elements 21 may be different from the shape of one of the plurality of second elements 22. Different types of elements are provided as the plurality of first elements 21 and the plurality of second elements 22.

In this example, one of the plurality of first elements 21 is provided between one of the plurality of second elements 22 and another one of the plurality of second elements 22. One of the plurality of second elements 22 is provided between one of the plurality of first elements 21 and another one of the plurality of first elements 21.

In this example, one of the plurality of first elements 21 includes the quasi-Yagi antenna 25A. One of the plurality of second elements 22 includes SIW 25S. The configuration of the SIW 25S may be the same as the configuration of the SIW 15B, for example. The SIW 25S includes an aperture, like the SIW 15B. One of the plurality of second elements 22 may further include a director similar to the director 15A in addition to the SIW 25S.

Thus, in the antenna device 111, each of the plurality of transmitting elements 15 includes the SIW 15B including the aperture 15Ba. One of the plurality of receiving elements 25 includes the quasi-Yagi antenna 25A. Another one of the plurality of receiving elements 25 includes the SIW 25S.

Figure 12:
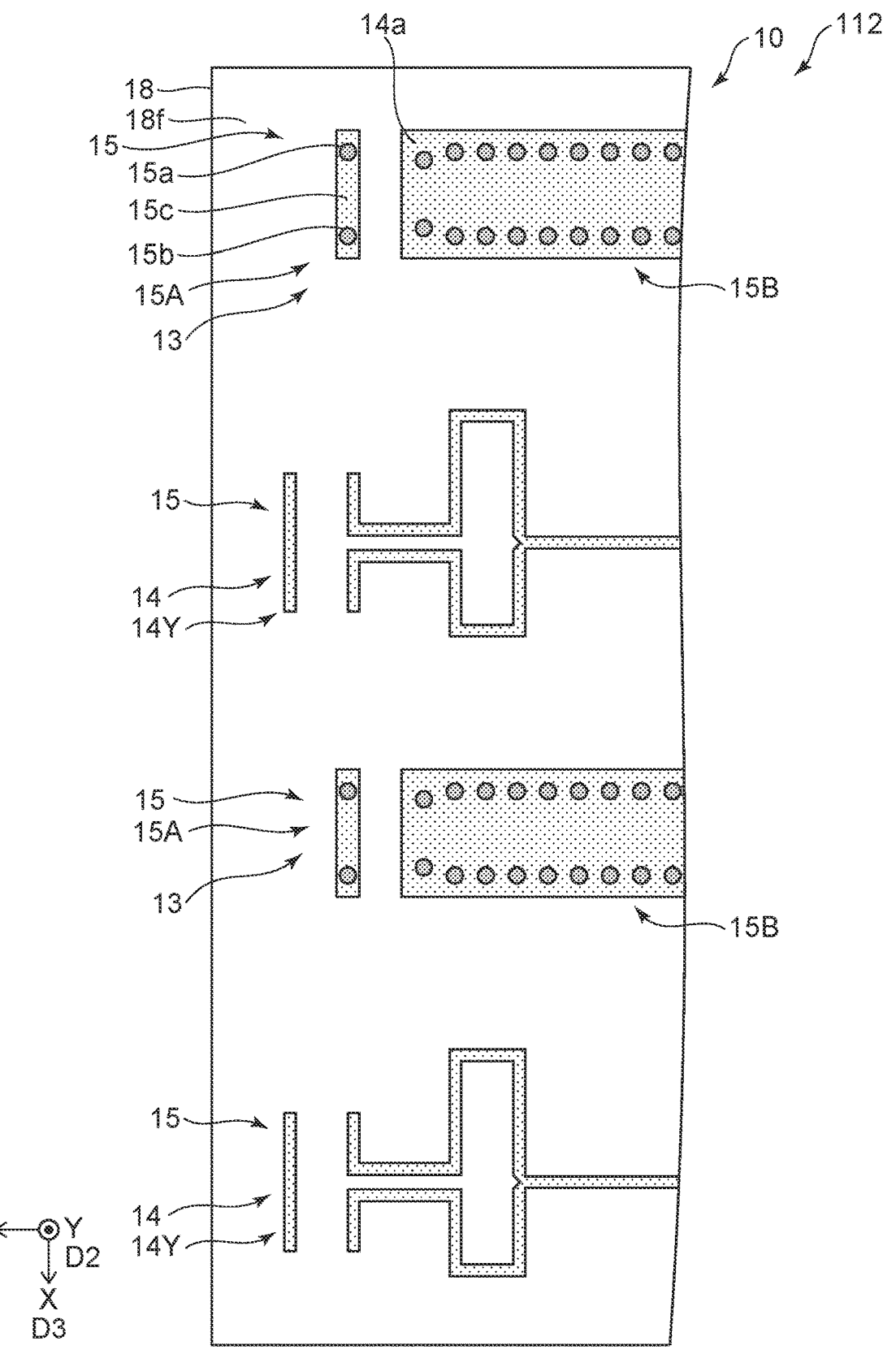
FIG. 12 is a schematic plan view illustrating a part of an antenna device according to the second embodiment.

FIG. 12 is a schematic plan view illustrating a part of an antenna device according to the second embodiment.

As shown in FIG. 12, in an antenna device 112 according to the embodiment, the configuration of the transmitting antenna 10 is different from the configuration of the transmitting antenna 10 in the antenna device 110. Except for this, the configuration of the antenna device 112 may be the same as the configuration of the antenna device 110. For example, the configuration of the receiving antenna 20 in the antenna device 112 is the same as the configuration of the receiving antenna 20 in the antenna device 110.

As shown in FIG. 12, the transmitting antenna 10 includes the plurality of transmitting elements 15. The plurality of transmitting elements 15 include a plurality of third elements 13 and a plurality of fourth elements 14. A second maximum value is larger than the maximum value of the mutual coupling between the plurality of receiving elements 25. The second maximum value is a maximum value of the maximum of the mutual coupling between the plurality of third elements 13, the maximum value of the mutual coupling between the plurality of fourth elements 14, and the maximum value of the mutual coupling between the plurality of third elements 13 and the plurality of fourth elements 14.

In this case also, the mutual coupling in the plurality of receiving elements 25 is small. Noise can be suppressed. An antenna device capable of improving performance can be provided.

The shape of one of the plurality of third elements 13 is different from the shape of one of the plurality of fourth elements 14. Different types of elements are provided as the plurality of third elements 13 and the plurality of fourth elements 14.

One of the plurality of third elements 13 is provided between one of the plurality of fourth elements 14 and another one of the plurality of fourth elements 14. One of the plurality of fourth elements 14 is provided between one of the plurality of third elements 13 and another one of the plurality of third elements 13.

In this example, one of the plurality of third elements 13 includes the SIW 15B including aperture 15Ba. One of the plurality of fourth elements 14 includes a quasi-Yagi antenna 14Y. The configuration of the quasi-Yagi antenna 14Y may be the same as the configuration of the quasi-Yagi antenna 25A, for example.

As described below, at least a part of the plurality of transmitting elements 15 may include the SIW 15B that include the aperture 15Ba. In this case, at least a part of the plurality of receiving elements 25 may include tapered slot antennas.

For example, each of the plurality of transmitting elements 15 includes the SIW 15B including the aperture 15Ba. In this case, one of the plurality of receiving elements 25 may include the quasi-Yagi antenna 25A, and another one of the plurality of receiving elements 25 may include the tapered slot antenna.

An example of a tapered slot antenna will be described below.

Figure 13:
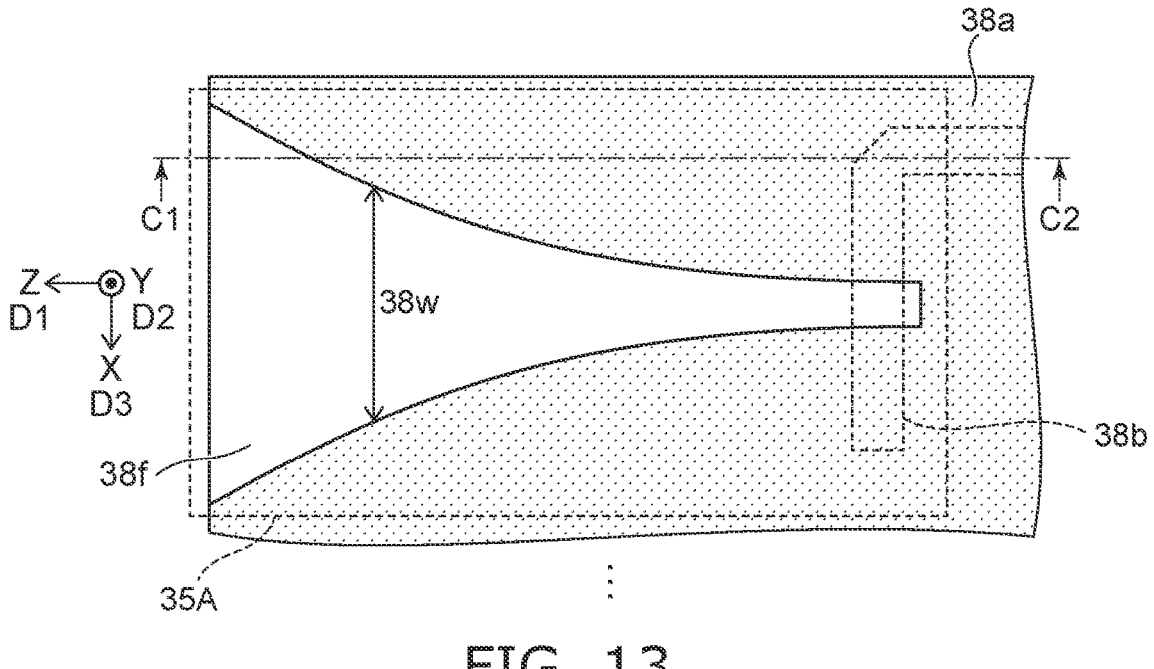
FIG. 13 is a schematic plan view illustrating a part of the antenna device according to the embodiment.

FIG. 13 is a schematic plan view illustrating a part of the antenna device according to the embodiment.

Figure 14:
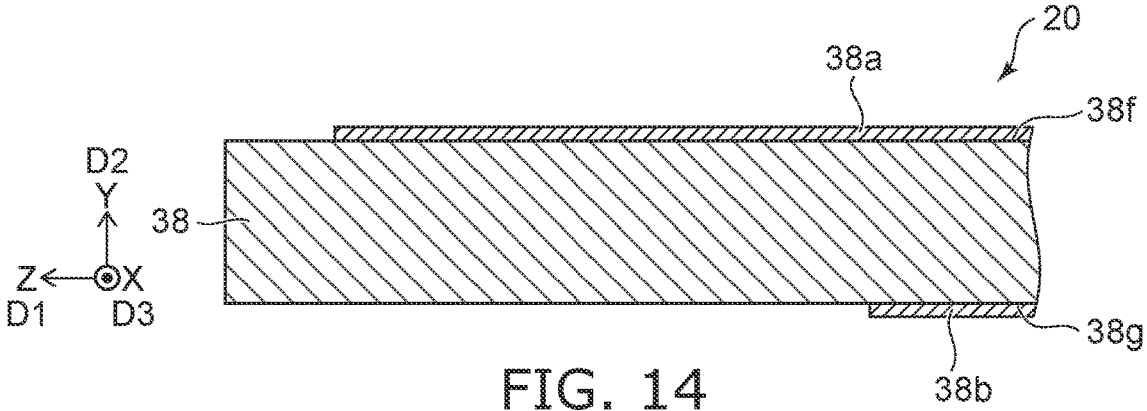
FIG. 14 is a schematic cross-sectional view illustrating a part of the antenna device according to the embodiment.

FIG. 14 is a schematic cross-sectional view illustrating a part of the antenna device according to the embodiment.

As shown in FIGS. 13 and 14, a tapered slot antenna 35A includes, for example, a third substrate 38, a feeding line 38b and a conductive layer 38a. In a case where at least one of the plurality of receiving elements 25 include the tapered slot antenna 35A, the third substrate 38 may be continuous with the second substrate 28 (see FIG. 1, etc.). The third substrate 38 includes a third face 38f and a third other face 38g. In this example, a direction from the third other face 38g to the third face 38f is along the second direction D2.

As shown in FIG. 14, a feeding line 38b is provided, for example, on the third other face 38g. The conductive layer 38a is provided on the third face 38f. The conductive layer 38a is, for example, a ground conductor. The feeding line 38b overlaps a part of the conductive layer 38a in the second direction D2. The feeding line 38b is, for example, a microstrip line.

As shown in FIG. 13, on the third face 38f, a width 38w along the third direction D3 of the region where the conductive layer 38a is not provided changes in the first direction D1. This area is tapered.

The tapered slot antenna 35A can transmit and receive an electric field in the +Z direction (direction away from the feeding line 38b in the Z-axis direction). The electric field is parallel to the X-axis direction.

A plurality of tapered slot antennas 35A may be provided, for example, along the third direction D3. At least a part of the plurality of receiving elements 25 may be such a tapered slot antenna 35A.

The antenna device described above can be used in a radar device. The embodiments may include a radar device. The radar device is provided in facilities. The facilities include, for example, airports, train stations, shopping malls, concert halls, or exhibition halls. The radar device is used, for example, when conducting a safety inspection to determine whether or not an inspection target person (user of a facility) is carrying a dangerous object.

For example, the radar device sequentially radiates radio waves to each point of the target person and sequentially receives radio waves reflected by each point of the target person. The target person is thereby scanned. An image including the target person is generated based on the received signals obtained by the scanning.

A facility administrator can determine whether or not the target person has a dangerous object by checking this image. The administrator can determine, for example, whether or not a dangerous item is hidden in the subject's belongings. The radar device or an external device may analyze the amplitude of the received signal. The radar device or an external device may warn of the level of likelihood that the target person is in possession of a hazardous item.

For example, in security inspections, multiple hazardous materials are detected in clothing pockets. High angular resolution is required for the radar devices used for the security inspections. Angular resolution is determined by the aperture length of the array antenna. For example, according to MIMO (multi-input and multi-output) radar, the aperture length is enlarged and the angular resolution is improved. Multiple antennas are provided in MIMO radar. This complicates the design and increases the cost. In the embodiments, the array antenna includes a small number of antennas. In the embodiments, a design for easy wiring is applied.

Figure 15:
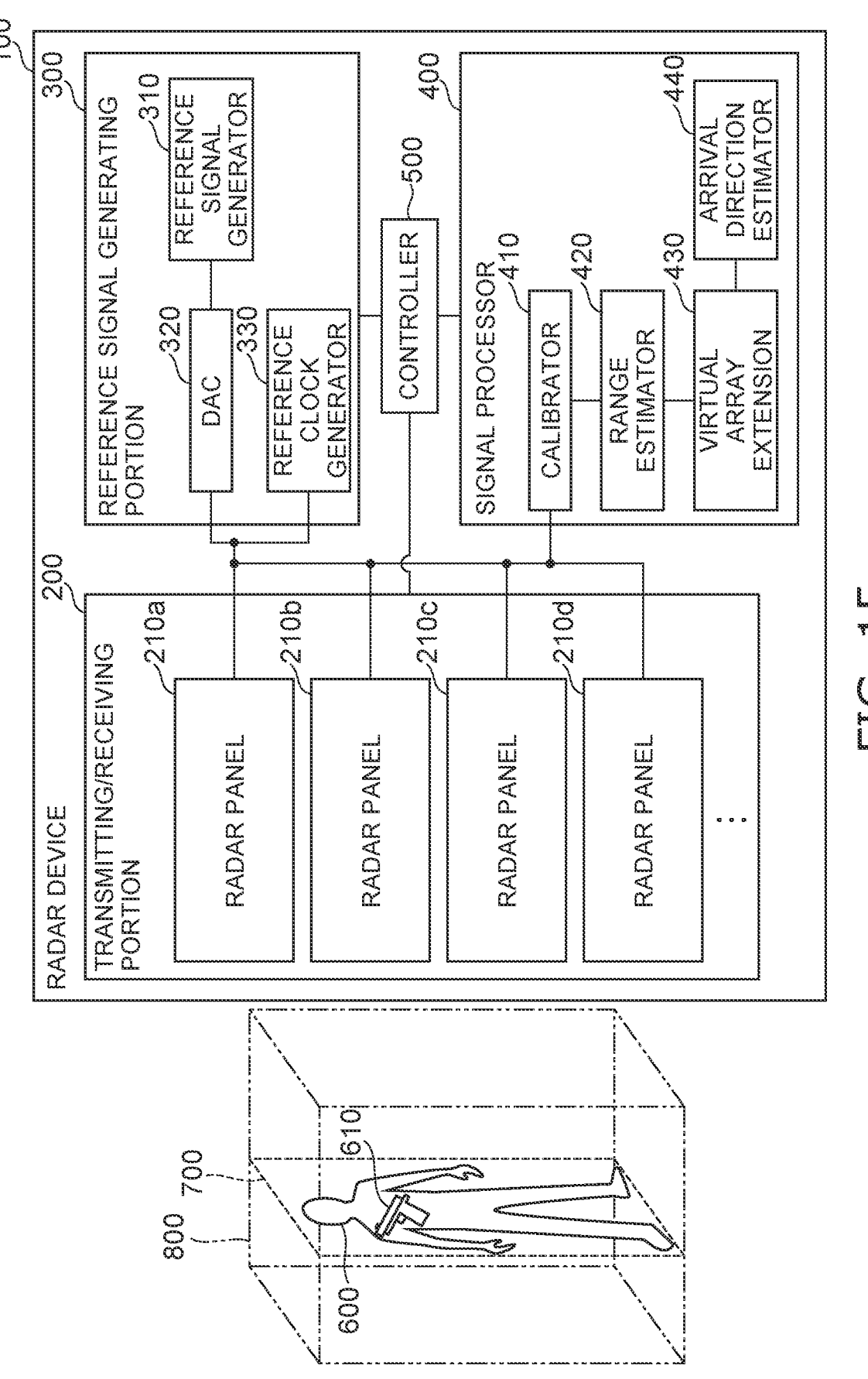
FIG. 15 is a block diagram illustrating the radar device according to the embodiment.

FIG. 15 is a block diagram illustrating the radar device according to the embodiment.

A radar device 100 includes, for example, a transmitting/receiving portion 200, a reference signal generating portion 300, a signal processor 400 and a controller 500. The antenna device described above is provided in the transmitting/receiving portion 200. The radar device 100 may be, for example, a radar system. The radar system may be, for example, an inspection radar system. The radar system may be, for example, a security check radar system.

The reference signal generating portion 300 includes a reference signal generator 310, a DAC (Digital to Analog Converter) 320 and a reference clock generator 330.

Various systems can be adopted as the radar system. For example, an FMCW (Frequency Modulated Continuous Wave) system can be adopted. In the FMCW radar, radio waves are radiated to a target and reflected radio waves from the target are received. In the FMCW radar, the distance to the target can be measured from the difference between the frequency of the transmitting signal and the frequency of the receiving signal.

The reference signal generator 310 generates, for example, a digital signal. This digital signal represents the FMCW signal (hereinafter referred to as the chirp signal). The frequency of the FMCW signal linearly increases over time.

The DAC 320 converts the digital signal generated by reference signal generator 310 into an analog signal. The DAC 320 generates a chirp signal of the analog signal.

The reference clock generator 330 generates a reference clock.

The chirp signal and the reference clock generated by the reference signal generating portion 300 are output to the transmitting/receiving portion 200. The connection between the reference signal generating portion 300 and the transmitting/receiving portion 200 is, for example, wired or wireless.

The transmitting/receiving portion 200 includes at least one (here, four) radar panels 210a, 210b, 210c and 210d. The number of radar panels included in the transmitting/receiving portion 200 may be two or more, or one.

The chirp signal and the reference clock are supplied to each of the radar panels 210a to 210d. Each of the radar panels 210a to 210d radiates radio waves corresponding to the chirp signal to the target and receives reflected radio waves from the target.

In the embodiment, the wavelength of radio waves is, for example, not less than 1 mm and not more than 30 mm. The radio waves with wavelengths not less than 1 mm and not more than 30 mm are, for example, millimeter waves. The radio waves with a wavelength of not less than 10 mm and not more than 100 mm are, for example, microwaves. The radio waves with a wavelength of not less than 100 μm and not more than 1 mm are, for example, terahertz waves. In the embodiments, millimeter waves, microwave or terahertz waves may be applied.

Each of the radar panels 210a to 210d converts the received reflected radio wave signal into an intermediate frequency signal (IF signal). The IF signal obtained by each of radar panels 210a to 210d is output to signal processor 400. The connection between each of the radar panels 210a to 210d and the signal processor 400 may be wired or wireless.

The signal processor 400 includes, for example, a calibrator 410, a range estimator 420, a virtual array extension 430 and an arrival direction estimator 440. The signal processor 400 performs signal processing on the respective IF signals of the radar panels 210a to 210d.

The signal processor 400 can obtain an image of the target 600 (target person) in a plane 700. The plane 700 is a plane within inspection space 800. The plane 700 is parallel to radar panels 210a to 210d. The inspection space 800 is a three-dimensional space located in the radiation direction of radio waves emitted from each of the radar panels 210a to 210d. The image is displayed, for example, by a display device. For example, by observing this image, the inspector can detect that the target 600 is carrying a dangerous object 610 (for example, a gun).

The radar device 100 may constantly radiate radio waves into the inspection space 800 to carry out the inspection at all times. The radar device 100 may include a camera that captures inspection space 800. The radar device 100 may recognize the target 600 from the image of the inspection space 800 captured by the camera. IN a case where the target 600 is recognized, the radar device 100 may radiate radio waves only to the target 600 for inspection. The controller 500 controls the operation of the radar device 100 including the transmitting/receiving portion 200.

The transmitting/receiving portion 200 is connected to the controller 500 by wire or wirelessly. The controller 500 controls transmitting frequencies and bands of transmitting antennas, transmitting timings of each of the plurality of transmitting antennas, and the like. The controller 500 controls the receiving timing (time from transmitting to receiving) of each of the plurality of receiving antennas.

The embodiments may include the following configurations (for example, technical proposals).

Configuration 1

An antenna device, comprising:

a transmitting antenna including a plurality of transmitting elements; and a receiving antenna including a plurality of receiving elements, a maximum value of a mutual coupling between the plurality of receiving elements being less than a maximum value of a mutual coupling between the plurality of transmitting elements.

Configuration 2

The antenna device according to Configuration 1, wherein the transmitting antenna includes a first substrate including a first face, the receiving antenna includes a second substrate including a second face, a plane including the second face crosses a plane including the first face, the plurality of transmitting elements are provided along the first face, and the plurality of receiving elements are provided along the second face.

Configuration 3

The antenna device according to Configuration 2, wherein the first face extends along a first direction and a second direction, the second direction crosses the first direction, the second face extends along the first direction and a third direction, and the third direction crosses a plane including the first direction and the second direction.

Configuration 4

The antenna device according to Configuration 3, wherein the second direction is orthogonal to the first direction, and the third direction is orthogonal to the first direction and the second direction.

Configuration 5

The antenna device according to Configuration 3 or 4, wherein a transmitting direction of the transmitting antenna is along the first direction, and a receiving direction of the receiving antenna is along the first direction.

Configuration 6

The antenna device according to any one of Configurations 3-5, wherein the plurality of transmitting elements are provided on a first surface of the first substrate, or at least a part of the plurality of transmitting elements are provided in the first substrate, the first surface is along the first face, the plurality of receiving elements are provided on a second surface of the second substrate, or at least a part of the plurality of receiving elements are provided in the second substrate, and the second surface is along the second face.

Configuration 7

The antenna device according to any one of Configurations 1-6, wherein a shape of one of the plurality of receiving elements is different from a shape of one of the plurality of receiving elements.

Configuration 8

The antenna device according to any one of Configurations 1-6, wherein the plurality of receiving elements includes a plurality of first elements and a plurality of second elements, a first maximum value is less than the maximum value of the mutual coupling between the plurality of transmitting elements, and the first maximum value is a maximum value of mutual coupling between the plurality of first elements, a maximum value of mutual coupling between the plurality of second elements, and a maximum value of mutual coupling between the plurality of first elements and the plurality of second elements.

Configuration 9

The antenna device according to Configuration 8, wherein one of the plurality of first elements is provided between one of the plurality of second elements and another one of the plurality of second elements, and the one of the plurality of second elements is provided between the one of the plurality of first elements and another one of the plurality of first elements.

Configuration 10

The antenna device according to Configuration 8, wherein a shape of one of the plurality of first elements is different from a shape of one of the plurality of second elements.

Configuration 11

The antenna device according to any one of Configurations 1-6, wherein the plurality of transmitting elements includes a plurality of third elements and a plurality of fourth elements, a second maximum value is greater than the maximum of the mutual coupling between the plurality of receiving elements, and the second maximum value is a maximum value of the maximum value of mutual coupling between the plurality of third elements, a maximum value of mutual coupling between the plurality of fourth elements, and a maximum value of mutual coupling between the plurality of third elements and the plurality of fourth elements.

Configuration 12

The antenna device according to Configuration 11, wherein one of the plurality of third elements is provided between one of the plurality of fourth elements and another one of the plurality of fourth elements, and the one of the plurality of fourth elements is provided between the one of the plurality of third elements and another one of the plurality of third elements.

Configuration 13

The antenna device according to Configuration 11, wherein a shape of one of the plurality of third elements is different from a shape of one of the plurality of fourth elements.

Configuration 14

The antenna device according to any one of Configurations 1-6, wherein at least a part of the plurality of transmitting elements includes an SIW (Substrate Integrated Waveguide) including an aperture, and at least a part of the plurality of receiving elements include a quasi-Yagi antenna.

Configuration 15

The antenna device according to any one of Configurations 1-6, wherein each of the plurality of transmitting elements includes an SIW (Substrate Integrated Waveguide) including an aperture, one of the plurality of receiving elements includes a quasi-Yagi antenna, and another one of the plurality of receiving elements includes an SIW including an aperture.

Configuration 16

The antenna device according to any one of Configurations 1-6, wherein at least a part of the plurality of transmitting elements includes an SIW (Substrate Integrated Waveguide) including an aperture, and at least a part of the plurality of receiving elements include a tapered slot antenna.

Configuration 17

The antenna device according to any one of Configurations 1-6, wherein each of the plurality of transmitting elements includes an SIW (Substrate Integrated Waveguide) including an aperture, one of the plurality of receiving elements includes a quasi-Yagi antenna, and another one of the plurality of receiving elements includes a tapered slot antenna.

Configuration 18

The antenna device according to any one of Configurations 3-6, wherein the plurality of receiving elements are arranged along the third direction, a distance along the third direction between a position of one of the plurality of receiving elements in the third direction and a position of another one the plurality of receiving elements in the third direction is equal to or less than a wavelength of a signal received by the plurality of receiving elements, and the other one of the plurality of receiving elements is next to the one of the plurality of receiving elements.

Configuration 19

A radar system, comprising:

the antenna device according to Configuration 1; and a controller configured to control transmission of the transmitting antenna and reception of the receiving antenna.

According to the embodiments, it is possible to provide an antenna device and a radar system capable of improving performance.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in antenna devices such as transmitting antenna, transmitting elements, receiving antennas, receiving element, substrates, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all antenna devices and all radar systems practicable by an appropriate design modification by one skilled in the art based on the antenna devices and radar systems described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An antenna device, comprising:
a transmitting antenna including a plurality of transmitting elements and a first substrate including a first face; and
a receiving antenna including a plurality of receiving elements and a second substrate including a second face, a maximum value of a mutual coupling between the plurality of receiving elements being less than a maximum value of a mutual coupling between the plurality of transmitting elements,
wherein:
a plane including the second face crosses a plane including the first face,
the plurality of transmitting elements are provided along the first face,
the plurality of receiving elements are provided along the second face,
the first face extends along a first direction and a second direction,
the second direction crosses the first direction,
the second face extends along the first direction and a third direction, and
the third direction crosses a plane including the first direction and the second direction.

2. The device according to claim 1, wherein;
the second direction is orthogonal to the first direction, and
the third direction is orthogonal to the first direction and the second direction.

3. The device according to claim 1, wherein;
a transmitting direction of the transmitting antenna is along the first direction, and
a receiving direction of the receiving antenna is along the first direction.

4. The device according to claim 1, wherein;
the plurality of transmitting elements are provided on a first surface of the first substrate, or at least a part of the plurality of transmitting elements are provided in the first substrate,
the first surface is along the first face,
the plurality of receiving elements are provided on a second surface of the second substrate, or at least a part of the plurality of receiving elements are provided in the second substrate, and
the second surface is along the second face.

5. The device according to claim 1, wherein;
at least a part of the plurality of transmitting elements includes an SIW (Substrate Integrated Waveguide) including an aperture, and
at least a part of the plurality of receiving elements includes a quasi-Yagi antenna.

6. The device according to claim 1, wherein:
each of the plurality of transmitting elements includes an SIW (Substrate Integrated Waveguide) including an aperture,
one of the plurality of receiving elements includes a quasi-Yagi antenna, and
another one of the plurality of receiving elements includes an SIW including an aperture.

7. The device according to claim 1, wherein;
at least a part of the plurality of transmitting elements includes an SIW (Substrate Integrated Waveguide) including an aperture, and
at least a part of the plurality of receiving elements includes a tapered slot antenna.

8. The device according to claim 1, wherein:
each of the plurality of transmitting elements includes an SIW (Substrate Integrated Waveguide) including an aperture,
one of the plurality of receiving elements includes a quasi-Yagi antenna, and
another one of the plurality of receiving elements includes a tapered slot antenna.

9. The device according to claim 1, wherein;
the plurality of receiving elements are arranged along the third direction,
a distance along the third direction between a position of one of the plurality of receiving elements in the third direction and a position of another one the plurality of receiving elements in the third direction is equal to or less than a wavelength of a signal received by the plurality of receiving elements, and
the another one of the plurality of receiving elements is next to the one of the plurality of receiving elements.

10. A radar system, comprising:
the antenna device according to claim 1; and
a controller configured to control transmission of the transmitting antenna and reception of the receiving antenna.

11. An antenna device comprising:
a transmitting antenna including a plurality of transmitting elements; and
a receiving antenna including a plurality of receiving elements, a maximum value of a mutual coupling between the plurality of receiving elements being less than a maximum value of a mutual coupling between the plurality of transmitting elements, wherein a shape of one of the pluralities of receiving elements is different from a shape of another one of the pluralities of receiving elements.

12. A radar system, comprising:

the antenna device according to claim 11; and a controller configured to control transmission of the transmitting antenna and reception of the receiving antenna.

13. An antenna device, comprising:

a transmitting antenna including a plurality of transmitting elements; and a receiving antenna including a plurality of receiving elements, a maximum value of a mutual coupling between the plurality of receiving elements being less than a maximum value of a mutual coupling between the plurality of transmitting elements, wherein:

the plurality of receiving elements include a plurality of first elements and a plurality of second elements, a first maximum value is less than the maximum value of the mutual coupling between the plurality of transmitting elements, and the first maximum value is a maximum value of mutual coupling between the plurality of first elements, a maximum value of mutual coupling between the plurality of second elements, and a maximum value of mutual coupling between the plurality of first elements and the plurality of second elements.

14. The device according to claim 13, wherein;

one of the plurality of first elements is provided between one of the plurality of second elements and another one of the plurality of second elements, and the one of the plurality of second elements is provided between the one of the plurality of first elements and another one of the plurality of first elements.

15. The device according to claim 13, wherein a shape of one of the plurality of first elements is different from a shape of one of the plurality of second elements.

16. An antenna device, comprising:

a transmitting antenna including a plurality of transmitting elements; and a receiving antenna including a plurality of receiving elements, a maximum value of a mutual coupling between the plurality of receiving elements being less than a maximum value of a mutual coupling between the plurality of transmitting elements, wherein:

the plurality of transmitting elements include a plurality of third elements and a plurality of fourth elements, a second maximum value is greater than the maximum of the mutual coupling between the plurality of receiving elements, and the second maximum value is a maximum value of the maximum value of mutual coupling between the plurality of third elements, a maximum value of mutual coupling between the plurality of fourth elements, and a maximum value of mutual coupling between the plurality of third elements and the plurality of fourth elements.

17. The device according to claim 16, wherein:

one of the plurality of third elements is provided between one of the plurality of fourth elements and another one of the plurality of fourth elements, and the one of the plurality of fourth elements is provided between the one of the plurality of third elements and another one of the plurality of third elements.

18. The device according to claim 16, wherein a shape of one of the plurality of third elements is different from a shape of one of the plurality of fourth elements.

* * * * *